United States Patent
Aoki

(10) Patent No.: US 6,214,961 B1
(45) Date of Patent: Apr. 10, 2001

(54) METHOD OF PRODUCING BRANCHED SILICONE OIL

(75) Inventor: Yoshitaka Aoki, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/200,462

(22) Filed: Nov. 27, 1998

(30) Foreign Application Priority Data

Nov. 28, 1997 (JP) .................................................. 9-344224

(51) Int. Cl.⁷ .................................................. C08G 77/08
(52) U.S. Cl. .................................. 528/21; 528/22; 528/23; 556/455; 556/456
(58) Field of Search .................................. 528/21, 22, 23; 556/455, 456

(56) References Cited

U.S. PATENT DOCUMENTS

| | | | |
|---|---|---|---|
| 3,308,093 | * | 3/1967 | Lentz .................................. 260/46.5 |
| 3,328,481 | * | 6/1967 | Vincent .................................. 260/825 |
| 3,361,714 | * | 1/1968 | Omietanski .................................. 260/46.5 |
| 4,073,801 | * | 2/1978 | Moretto et al. .................................. 260/448.2 E |
| 4,577,523 | * | 3/1986 | Groehof .................................. 74/200 |
| 5,212,274 | * | 5/1993 | Tsukuno .................................. 528/14 |
| 5,391,674 | * | 2/1995 | Hara et al. .................................. 528/14 |
| 5,679,822 | * | 10/1997 | LeGrow et al. .................................. 556/455 |

FOREIGN PATENT DOCUMENTS

| | | |
|---|---|---|
| 0 217 501 | 4/1987 | (EP) . |
| 0 540 038 | 5/1993 | (EP) . |
| 09208701 | 12/1997 | (JP) . |

OTHER PUBLICATIONS

Patent Abstracts of Japan, vol. 1997, No. 12, Dec. 25, 1997 (1997–12–25) & JP 09 208701 A (Shin Etsu Chem Co Ltd.), Aug. 12, 1997 (1997–08–12), abstract.

* cited by examiner

*Primary Examiner*—Margaret G. Moore
(74) *Attorney, Agent, or Firm*—Millen White Zelano & Branigan

(57) ABSTRACT

A method of producing a branched silicone oil which comprises mixing 100 parts by weight of an organopolysiloxane represented by the following formula (I) and/or an organopolysiloxane represented by the following formula (II) with 0.1 to 100 parts by weight of an organopolysiloxane represented by the following formula (III) and causing these oranopolysiloxanes to undergo condensation and equilibration reactions by heating them in the presence of basic catalysts:

(I)

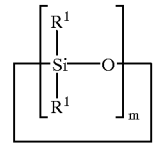

(II)

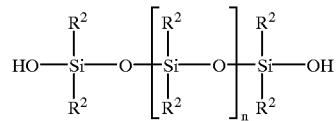

wherein $R^1$ and $R^2$ are each a monovalent hydrocarbon group containing 1 to 20 carbon atoms, m is an integer from 3 to 7, and n is an integer of 0 or above;

(III)

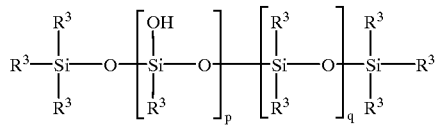

wherein $R^3$ is a monovalent hydrocarbon group containing 1 to 20 carbon atoms, p is a number from 1 to 100, and q is a number from 0 to 100.

13 Claims, No Drawings

METHOD OF PRODUCING BRANCHED SILICONE OIL

FIELD OF THE INVENTION

The present invention relates to a method of producing a branched silicone oil and, more particularly, to a simplified method for producing a branched silicone oil having stable physical properties.

BACKGROUND OF THE INVENTION

Branched silicone oils have excellent low-temperature characteristics and therein at least three units per molecule of terminal functional groups can be introduced, so that they have hitherto been utilized as hydraulic fluid, such as brake oil, and base oil for curable silicones [as disclosed in the gazettes, e.g., Japanese Tokko Sho 55-21781 (corresponding to U.S. Pat. No. 4,137,189 and GB Patent 1,582,371), Japanese Tokko Sho 59-43515 (corresponding to U.S. Pat. No. 3,833,505 and GB Patent 1,435,161) and Japanese Tokko Sho 59-41394, wherein the term "Tokko" means an "examined patent publication" ]. In recent years, branched silicone oils have also been used as a constituent of a silicone antifoaming agent to substantially extend the duration of antifoaming effect [as disclosed in, e.g., Japanese Tokkai Hei 5-271689 (corresponding to U.S. Pat. No. 5,376,301 and EP Patent 549,232), wherein the term "Tokkai" means an "unexamined published patent application"].

As methods of producing branched silicone oils, there have so far been known the method of condensing hydrolysis products of an alkyltrichlorosilane and a dialkylpolysiloxane in the presence of an equilibration catalyst (European Patent No. 31532), the method of reacting a hydroxyl group-containing organopolysiloxane comprised of $R_3SiO_{1/2}$ units and $SiO_2$ units with a diorganopolysiloxane having silanol groups at the both ends in the presence of a condensation or equilibration catalyst (European Patent No. 217501), and the method of mixing a diorganopolysiloxane with a vinyl monomer or a vinyl group-containing diorganopolysiloxane and causing a reaction between them by the use of a radical polymerization initiating catalyst (European Patent No. 273448).

However, the branched silicone oils produced by those methods fluctuate in finished viscosity in view of the nature of the reactions, and so they have a drawback of being not consistent in oil characteristics.

In addition, there is known the method of using an alkyltrimethoxysilane or hydrolysis condensates thereof as the source of $RSiO_{3/2}$ units and allowing it to undergo the equilibration reaction with a dialkylpolysiloxane. However, the products obtained by such a method are liable to gelation because of the alkoxy groups remaining unreacted. Therefore, that method has a defect that the intended products cannot be obtained consistently.

SUMMARY OF THE INVENTION

As a result of our intensive study which has been made for the purpose of simplified and consistent production of a branched silicone oil, it has been found that the intended purpose can be realized by using 1,1,1,3,5,7,7,7-octamethyl-3,5-dihydroxytetrasiloxane in the equilibration reaction of organopolysiloxanes, thereby achieving the present invention.

Therefore, an object of the present invention is to provide a method of producing a branched silicone oil simply and consistently.

The above-described object of the present invention is attained with a method of producing a branched silicone oil, which comprises mixing 100 parts by weight of an organopolysiloxane represented by the following formula (I) and/or an organopolysiloxane represented by the following formula (II) with 0.1 to 100 parts by weight of an organopolysiloxane represented by the following formula (III), and causing the oranopolysiloxanes to undergo condensation and equilibration reactions by heating them in the presence of basic catalysts:

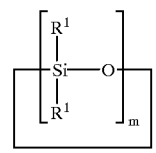

(I)

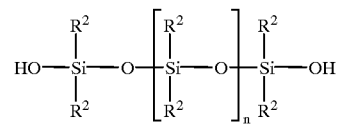

(II)

wherein $R^1$ and $R^2$ are each a monovalent hydrocarbon group containing 1 to 20 carbon atoms, m is an integer from 3 to 7, and n is an integer of 0 or above;

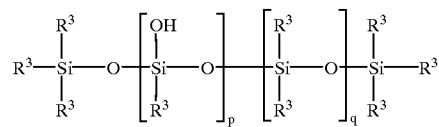

(III)

wherein $R^3$ is a monovalent hydrocarbon group containing 1 to 20 carbon atoms, p is a number from 1 to 100, and q is a number from 0 to 100.

DETAILED DESCRIPTION OF THE INVENTION

The organopolysiloxanes of formulae (I) and (II) are generally used for industrial purpose, and so they are easily available as commercial products.

Examples of a hydrocarbon group represented by $R^1$, $R^2$ and $R^3$ each include alkyl groups such as methyl, ethyl, propyl, butyl, pentyl, hexyl, heptyl, octyl, decyl, dodecyl, tetradecyl, hexadecyl and octadecyl groups, cycloalkyl groups such as cyclopentyl and cyclohexyl groups, aryl groups such as phenyl and tolyl groups, and unsaturated alkyl groups such as vinyl and allyl groups. It is desirable in the present invention that at least 90 mole % of the total hydrocarbon groups represented by $R^1$, $R^2$ and $R^3$ be methyl groups.

n is preferably from 10 to 1,000. p is a number from 1 to 100. This is because, when p is greater than 100, the organopolysiloxane of formula (III) is difficult to handle due to its high viscosity. In particular, it is advantageous to the present invention that p is from 2 to 10. q is a number from 0 to 100. This is because, when q is greater than 100, the proportion of R(OH)SiO— units in formula (III) is relatively lowered; as a result, increasing the amount of organopolysiloxane of formula (III) mixed becomes necessary to decrease the production efficiency. In particular, it is advantageous to the present invention that q is from 0 to 10.

The hydroxyl group-containing organopolysiloxanes represented by formula (III) can be easily produced using a known method, e.g., the method of reacting an organopolysiloxane represented by the following formula (IV) with water through the dehydrogenation reaction in the presence of palladium-carbon catalyst:

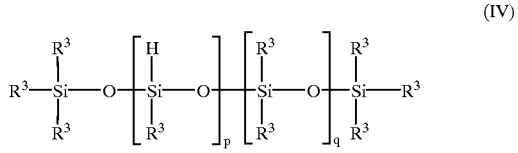

(IV)

The hydroxyl group-containing organopolysiloxane of formula (III) is mixed in an amount of 0.1–100 parts by weight per 100 parts by weight of the organopolysiloxane(s) represented by formula (I) and/or (II). Preferably, the amount of organopolysiloxane of formula (III) mixed is from 0.1 to 10 parts by weight. When the amount mixed is less than 0.1 parts by weight, the branched silicone oil obtained is insufficient in low temperature characteristic and antifoaming characteristic; while, when it is more than 100 parts by weight, fine gelled matter is formed as by-products.

In other words, if the amounts of organopolysiloxanes (I) and/or (II), and (III) mixed are expressed in the proportions of structural units in the branched silicone oil as the final product, it is desirable to mix them so that the ratio $[R^3{}_3SiO_{1/2}]/([R^1{}_2SiO_{2/2}$ and/or $R^2{}_2SiO_{2/2}]+[R^3{}_2SiO_{2/2}])/[R^3SiO_{3/2}]$ is (0.2–10)/(80–99.7)/(0.1–10) by mole %. By mixing these organopolysiloxanes in the foregoing proportions, the branched organopolysiloxanes as the final product can acquire excellent low-temperature characteristic and antifoaming characteristic. The thus produced branched organopolysiloxanes have their viscosities in the range of about 100 to about 100,000 cs at 25° C.

In the present production method, the condensation reaction between hydroxyl groups and the equilibration reaction are carried out at a temperature of 80–130° C. in the presence of at least one basic catalyst selected from alkaline quaternary salts, such as tetrabutylphosphonium hydroxide and tetramethylammonium hydroxide, or the silanolates of those salts. Further, the present production method includes the step of completing the equilibration reaction by the addition of an alkali metal hydroxide, such as sodium hydroxide, potassium hydroxide or cesium hydroxide, or the silanolate of such a hydroxide at a temperature of 130–200° C., and a step of neutralization.

Therefore, the basic catalysts usable in the present invention include not only the foregoing alkaline quaternary salts, such as tetrabutylphosphonium hydroxide, and the silanolates thereof but also alkali metal hydroxides and the silanolates thereof.

The alkaline quaternary salts as recited above and the silanolates thereof function mainly so as to progress the condensation reaction between hydroxyl groups. In particular, the use of tetrabutylphosphonium hydroxide silanolate (containing 10% of tetrabutylphosphonium hydroxide) is advantageous to the present invention.

Such a basic catalyst is added in a proportion of 500–5,000 ppm, preferably 750–3,000 ppm, to the total organopolysiloxanes. After the addition of the catalyst, the condensation reaction and the equilibration reaction attendant thereon are run for 0.5–4 hours at 80–130° C. Taking into account the distillation of water produced by the condensation reaction from the reaction system, it is desirable that the reaction temperature be set at 100–130° C.

The alkali metal hydroxides as recited above and the silanolates thereof are used for advancing the progress of the equilibration reaction. In view of such a purpose, the use of potassium hydroxide silanolate (containing 10% of potassium hydroxide) is beneficial in particular. In order to complete the equilibration reaction, the foregoing basic catalyst is added and the stirring is continued for 1–10 hours at 130–200° C. The suitable amount of the catalyst added herein is from 250 to 3,000 ppm, particularly 500 to 2,000 ppm.

After the equilibration reaction, the neutralization is carried out in the present invention. Examples of a neutralizing agent usable herein include inorganic acids such as hydrochloric acid, sulfuric acid and phosphoric acid, organic acids such as formic acid, acetic acid, propionic acid and malonic acid, organic acid substances such as ethylene chlorohydrin, tributyl phosphate, tricresyl phosphate and silyl phosphate, and carbon dioxide. Of these examples, organic acid substances are preferred over the others because of their good dispersibility in silicone oils. Further, low molecular weight organopolysiloxanes formed as by-products may be removed, if desired. After neutralization, such by-product can be removed by the stripping operation carried out under the condition of 1–10 hours' heating at 100–300° C. and reduced pressure.

In accordance with the present production method, 100 parts by weight of the organopolysiloxane(s) of formula (I) and/or formula (II) is mixed with 0.1–100 parts by weight of the organopolysiloxane of formula (III), and the equilibration reaction between them is completed with ease by the addition of basic catalysts and the heating under proper conditions. Thus, the organopolysiloxanes mixed are free from alkoxy groups or the like which are hard to undergo conversion and can be terminal groups of the product obtained. As a result, the branched silicone oil having stable physical properties can be obtained, and that with ease.

The present invention will now be illustrated in greater detail by reference to the following examples. However, the invention should not be construed as being limited to these examples.

The entire disclosure of all applications, patents and publications, cited above, and of corresponding Japanese application, No. 9-344224, filed Nov. 28, 1997, is hereby incorporated by reference.

Additionally, all "%" described below are by weight unless otherwise noted.

EXAMPLE 1

1,1,1,3,5,7,7,7-Octamethyl-3,5-dihydroxytetrasiloxane in an amount of 8.5 g was mixed with 192 g of octamethylcyclotetrasiloxane and 0.2 g of tetrabutylphosphonium hydroxide silanolate (containing 10% of tetrabutylphosphonium hydroxide), and heated for 2 hours at 110–120° C. with stirring under a stream of nitrogen. During this process, vaporization of the water produced by condensation reaction was recognized.

Further, the foregoing reaction mixture was admixed with 0.2 g of potassium hydroxide silanolate (containing 10% of potassium hydroxide), and heated for 4 hours at 150–160° C. with stirring. After the reaction system was cooled to 80–90° C., 0.2 g of ethylene chlorohydrin was added thereto, and stirred for 2 hours as the temperature was kept at 80–90° C. The reaction product obtained was heated for 2 hours at 150–160° C. under the reduced pressure of 10 mmHg, thereby removing low molecular weight siloxanes therefrom. Thus, a branched silicone oil having a viscosity of 2,100 cs at 25° C. was obtained. This branched silicone oil was confirmed by $^{29}$Si-NMR analysis to have the following composition:

[(CH$_3$)$_3$SiO$_{1/2}$]/[(CH$_3$)$_2$SiO$_{2/2}$]/[CH$_3$SiO$_{3/2}$]=2.1/95.8/2.1 (mole %).

EXAMPLE 2

Another branched silicone oil having a viscosity of 120,000 cs at 25° C. was produced in the same manner as in Example 1, except that the amount of 1,1,1,3,5,7,7,7-octamethyl-3,5-dihydroxytetrasiloxane used was changed to 1.7 g and the amount of octamethylcyclotetrasiloxane used was changed to 198 g. The composition of this branched silicone oil determined by $^{29}$Si-NMR analysis was as follows:

[(CH$_3$)$_3$SiO$_{1/2}$]/[(CH$_3$)$_2$SiO$_{2/2}$]/[CH$_3$SiO$_{3/2}$]=0.4/99.2/0.4 (mole %).

COMPARATIVE EXAMPLE 1

The co-hydrolysis product having the composition of

[(CH$_3$)$_3$SiO$_{1/2}$]/[(CH$_3$)$_2$SiO$_{2/2}$]/[CH$_3$SiO$_{3/2}$]=1.0/1.0/1.0 (mole %), which was prepared from trimethylchlorosilane, dimethyl-dichlorosilane and methyltrichlorosilane, was mixed in an amount of 2.4 g with 197.60 g of octamethylcyclotetrasiloxane. In the resulting mixture, the ratio of the units prepared was

[(CH$_3$)$_3$SiO$_{1/2}$]/[(CH$_3$)$_2$SiO$_{2/2}$]/[CH$_3$SiO$_{3/2}$]=0.4/99.2/0.4 (mole %).

The foregoing mixture was further admixed with 0.2 g of potassium siliconate, and stirred at 150–160° C. By 30 minutes' stirring, the reaction mixture caused gelation.

What is claimed is:

1. A method of producing a branched silicone oil; comprising mixing 100 parts by weight of an organopolysiloxane represented by the following formula (I) and/or an organopolysiloxane represented by the following formula (II) with 0.1 to 100 parts by weight of an organopolysiloxane represented by the following formula (III), and causing the oranopolysiloxanes to undergo condensation and equilibration reactions by heating them in the presence of a basic catalysts:

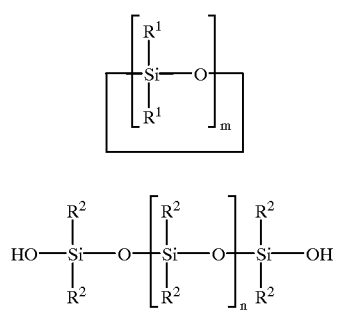

wherein R$^1$ and R$^2$ are each a monovalent hydrocarbon group containing 1 to 20 carbon atoms, m is an integer from 3 to 7, and n is an integer of 0 or above;

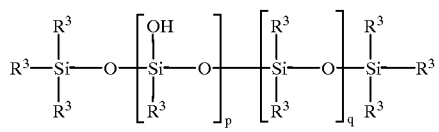

wherein R$^3$ is a monovalent hydrocarbon group containing 1 to 20 carbon atoms, p is a number from 1 to 100, and q is a number from 0 to 100.

2. A method of producing a branched silicone oil according to claim 1, wherein p in formula (III) is 2 and q in formula (III) is 0.

3. A method of producing a branched silicone oil according to claim 1, wherein n in formula (II) is an integer from 10 to 1,000.

4. A method of producing a branched silicone oil according to claim 1; wherein the condensation and equilibration reactions are caused by heating to 80–130° C. in the presence of at least one basic catalyst selected from the group consisting of alkaline quaternary salts and the silanolates thereof, and the equilibration reaction is completed by further adding an alkali metal hydroxide or a silanolate thereof and heating to 130–200° C., and then neutralization.

5. A method of producing a branched silicone oil according to claim 4; wherein the alkaline quaternary salts are tetrabutylphosphonium hydroxide and tetramethylammonium hydroxide, and the alkali metal hydroxide is sodium hydroxide, potassium hydroxide or cesium hydroxide.

6. A method of producing a branched silicone oil according to claim 4; wherein the amount of alkaline quaternary salt or silanolate thereof used is from 500 to 5,000 ppm and the amount of alkali metal hydroxide or silanolate thereof is from 250 to 3,000 ppm.

7. A method according to claim 6, wherein the amount of alkaline quaternary salt or silanolate thereof used is from 750–3000 ppm and the amount of alkali metal hydroxide or silanolate thereof is from 500 to 2000 ppm.

8. A method according to claim 4, wherein the neutralization is conducted with an inorganic acid, an organic acid, or an organic acid substance.

9. A method according to claim 8, wherein the inorganic acid is hydrochloric acid, sulfuric acid, or phosphoric acid; the organic acid is formic acid, acetic acid, propionic acid, or malonic acid; or the organic acid substance is ethylene chlorohydrin, tributyl phosphate, tric resoyl phosphate, silyl phosphate or carbon dioxide.

10. A method of producing a branched silicone oil according to claim 1; wherein at least 90 mole % of the total hydrocarbon groups represented by R$^1$, R$^2$ and R$^3$ are methyl groups.

11. A method of producing a branched silicone oil according to claim 1, wherein the amount of organopolysiloxane of formula (III) mixed is from 0.1 to 10 parts by weight.

12. A method of producing a branched silicone oil, comprising mixing 100 parts by weight of an organopolysiloxane represented by the following formula (I) and/or an organopolysiloxane represented by the following formula (II)

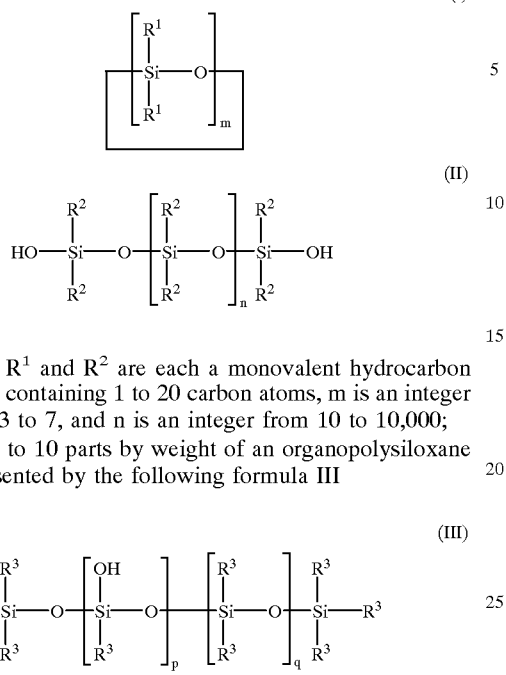

wherein $R^1$ and $R^2$ are each a monovalent hydrocarbon group containing 1 to 20 carbon atoms, m is an integer from 3 to 7, and n is an integer from 10 to 10,000; with 0.1 to 10 parts by weight of an organopolysiloxane represented by the following formula III wherein $R^3$ is a monovalent hydrocarbon group containing 1 to 20 carbon atoms, p is 2, and q is 0.

13. A method of producing a branched silicone oil; comprising mixing 100 parts by weight of an organopolysiloxane represented by the following formula (I) and/or an organopolysiloxane represented by the following formula (II) with 0.1 to 100 parts by weight of an organopolysiloxane represented by the following formula (III), and causing the oranopolysiloxanes to undergo condensation and equilibration reactions by heating them in the presence of basic catalysts:

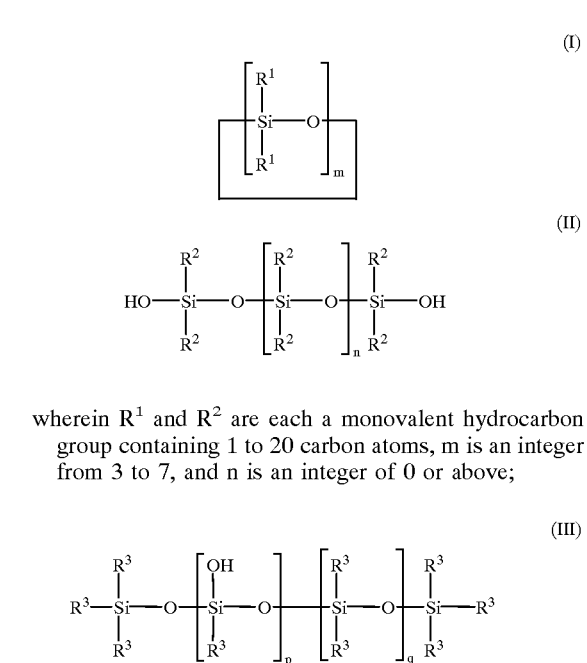

wherein $R^1$ and $R^2$ are each a monovalent hydrocarbon group containing 1 to 20 carbon atoms, m is an integer from 3 to 7, and n is an integer of 0 or above;

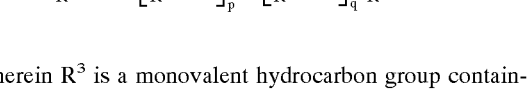

wherein $R^3$ is a monovalent hydrocarbon group containing 1 to 20 carbon atoms, p is a number from 2 to 10, and q is a number from 0 to 10.

* * * * *